United States Patent Office 3,498,951
Patented Mar. 3, 1970

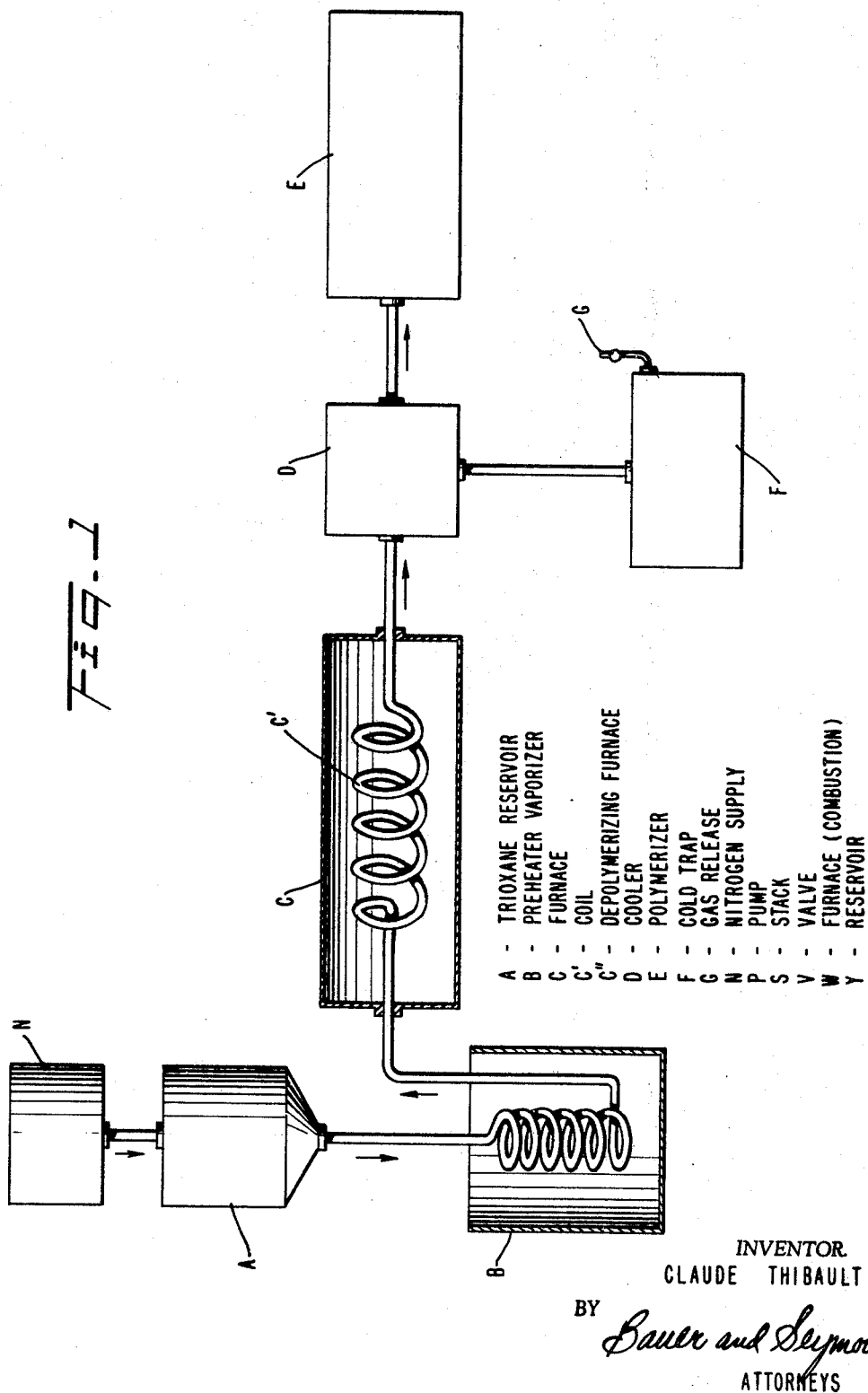

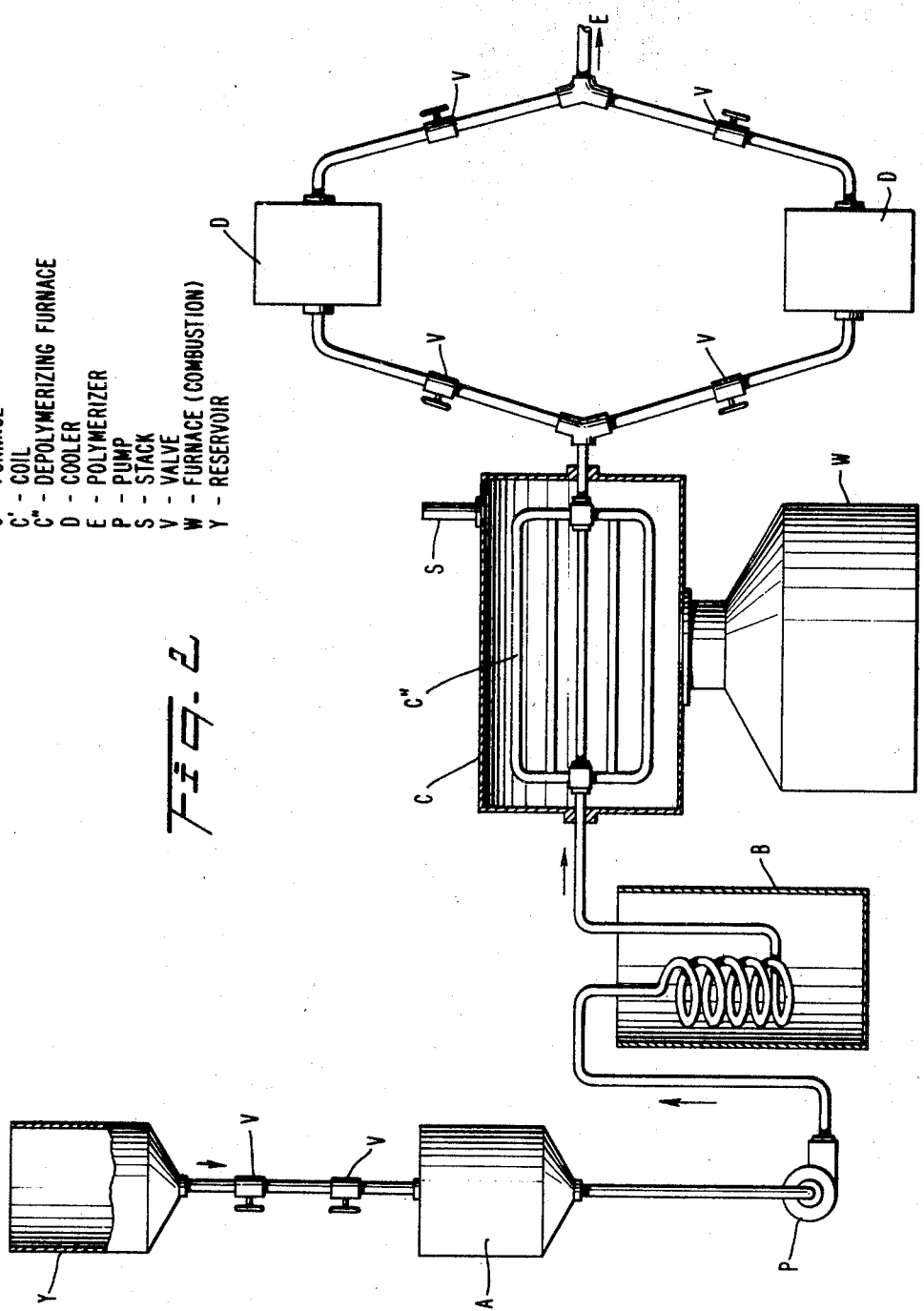

3,498,951
MANUFACTURE OF FORMALDEHYDE AND ITS POLYMERS
Claude Thibault, Saint-Mande, France, assignor to Produits Chimiques Pechiney Saint-Gobain, Neuilly-sur-Seine, France
Filed June 19, 1964, Ser. No. 376,463
Claims priority, application France, June 21, 1963, 938,966
Int. Cl. C07c 45/24, 47/04
U.S. Cl. 260—67                     10 Claims

ABSTRACT OF THE DISCLOSURE

This invention relates to the formation of a formaldehyde product which contains less than 300 p.p.m. of water and is free from CO and H and is stable against polymerization at −80° C. for a long period of time by non-catalytic pyrolytically decomposing trioxane at atmospheric pressure and at a temperature of between 350° C. to 500° C., preferably at a temperature between 380° and 420° C., and apparatus for performing this process.

---

This invention relates to the manufacture of a very pure formaldehyde which is adapted to the formation of polymers by a process which is efficient, controllable, and adaptable to the continuous manufacture of polymers.

One process of preparing formaldehyde is by the depolymerization of alphapolyoxymethylene, but the monomer thus produced is impure and its purification is difficult as to steps and costly and complex as to apparatus. Another prior process of making formaldehyde is by the action of phosphoric or polyphosphoric acids, potassium sulphate and ion exchange resins on trioxane, the trimer of formaldehyde, but in that process the formation of formaldehyde monomer by depolymerization is accompanied by a partial decomposition into carbon and water.

It is an object of the invention to produce pure monomeric formaldehyde in relatively simple apparatus, with a minimum of decomposition, in a yield which is practically quantitative.

The objects of the invention, generally speaking, are accomplished by a method of making very pure formaldehyde which comprises pyrolytically depolymerizing trioxane containing only minute amounts of water at atmospheric pressure in inert medium at a depolymerizing temperature below the temperature of disintegration of the trioxane.

Commercial trioxane contains impurities, such as methylene chloride and water, which degrade the monomer formed from it. It is consequently purified before use in my process. Processes of rectification and sublimation are known by which the impurities contained can be largely eliminated, the water content being reduced to 300 p.p.m. or less and the chlorine being eliminated.

In my process the temperature of depolymerization is controlled within a range which includes the lowest temperature at which the monomerization of the trimer takes place, about 350° C., and the temperature at which decomposition will occur, about 500° C. A preferred range for operation lies between 380° and 420° C. Above 420° C. there is a slight decomposition to CO and H, which does not exceed 0.1% at 420° C. and 0.5% at 450° C. and which can be ignored as they do not interfere at such concentration with the polymerization of the monomer with which they are mixed. On the other hand, they can be readily removed by cooling the monomer to −80° C. at which it is a liquid and they remain gaseous.

The monomerization takes place in an oxygen-free atmosphere. This can be accomplished by sweeping out the atmosphere from the apparatus of reaction with a current of nitrogen before the trimer is admitted to it, and by excluding oxygen-containing gases from it during the pyrolytic monomerization of the trioxane. Other inert gases may be used and may be present during the pyrolytic stage if desired. Thus, a current of mixed trioxane and inert gas may be sent through the apparatus throughout the process.

The pyrolytic monomerization may also be carried out in liquid medium, for instance in a solvent, of which cyclohexane and toluene are examples, being, as required of all such media, inert to the trioxane and the formaldehyde, and which, with their content of trioxane, are vaporized either as they enter the monomerization zone or before.

The rate of flow of gaseous trioxane through the cracking furnace is a function of the volume of the apparatus, and the rate at which the trimer depolymerizes at the temperature employed, taking into consideration the effect of the type of flow, for example simple or turbulent, on the rate of heat exchange.

The formaldehyde is produced at practically quantitative yield, usually 98% or better of the weight of the trioxane, is very pure, contains no methyl formate, methanol, or methylol decomposition products, which have been known to form in prior processes of depolymerization of trioxane. Water is present in the same amount carried into the furnace in the trioxane mixture, usually about 190 to 280 p.p.m. The new product is limpid, stores for many weeks at −80° C. without change and without indicating the beginning of polymerization, which is a good test of the purity of the monomer.

The product of the new process is superior and is valuable in processes and uses in which purity and high quality are desirable. For example, it produces polymers or copolymers of high quality and of high molecular weight when subjected to ordinary processes of polymerizing formaldehyde alone or mixed with compatible monomers.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a flow sheet of an apparatus conforming to the principles of the invention, and FIG. 2 is a flow sheet of an apparatus of similar type which is particularly adapted to continuous methods of production.

In the drawing the numeral N refers to a source of nitrogen which may be flowed through the entire apparatus to sweep out the air initially contained and thereafter to maintain an inert atmosphere during the process. A refers to a trioxane reservoir which contains purified trioxane, as explained above, in a molten and fluid state which can be flowed through the apparatus at any rate chosen by the operators of the process. B indicates a preheater vaporizer in which the molten trioxane is put into gas phase. C indicates an electric furnace containing the coil C' through which the gaseous trioxane flows. D indicates a cooler having two paths of discharge, one toward E and one toward F, which may be used simultaneously or alternately. E refers to a polymerizer of the standard type employed in the polymerization of formaldehyde. F is a cold-trap which is maintained at a temperature at which formaldehyde is liquid, the gases usually found in the formaldehyde being unchanged in phase and capable of discharge through a gas release G.

The apparatus is generally constructed of borosilicate glass, of quartz, or of glass-lined steel, as the metals which are usually employed to make apparatus for such processes tend to color the product, to cause some decomposition, or to form some mixed deposits. The apparatus includes a heating furnace which may contain a coil, a bank of tubes, or any other system which allows the trioxane to be kept in a gaseous state at the temperature of depolymerization. In a preferred form the furnace is supplied from a reservoir of molten trioxane through a trioxane vaporizer, which furnace is followed by a heat exchanger and by cold traps and/or polymerizing apparatus. The cold traps are chilled to −80° C. which liquefies the formaldehyde. On the other hand the naissant formaldehyde from the monomerization may be sent directly to a polymerizer from the heat exchanger. The function of the heat exchanger in this case is to bring the temperature of the formaldehyde into a range at which polymerization proceeds favorably. The purification of the trioxane before depolymerization can be carried out by any known process which will produce the degree of purity stated hereinabove. Among such processes are rectification, sublimation and crystallization. The purification of formaldehyde by these methods is not a part of this invention put has already been employed. However, in order to obtain polymers of high molecular weight it is necessary to use the monomers of high purity as prepared hereinabove. An advantage of this process is that it produces a very pure monomer which yields products of high molecular weight, 53,000 being exemplary. The process of polymerization may be such as has been successfully employed heretofore, among which is that described in the application Ser. No. 60,956, filed Oct. 6, 1960.

An apparatus particularly adapted to the continuous preparation of the polymer is shown in FIG. 2. In that figure the indicia are the same as in FIG. 1, except for the addition of Y which refers to reservoir, V which refers to valves, P which indicates a pump, and C″ which indicates a water tube cracking furnace, the heat from which is derived from a combustion furnace W the exhaust products of which pass off through a stack S.

The depolymerization of trioxane may be carried out in this process intermittently or continuously. The following examples illustrate the invention without limiting the generality of what is stated elsewhere herein.

EXAMPLE 1

The apparatus included a reservoir of molten trioxane provided with an apparatus for the maintenance of a chosen pressure. This apparatus was heated by infrared rays. The reservoir was connected to a vaporizer preheater which included a coil submerged in dioctyl phthalate maintained at 200° C. This vaporizer was connected to an electric furnace 1 m. long and 95 mm. in diameter within which was a borosilicate glass coil 65 mm. in diameter, 29 turns long, formed from a tube having an interior diameter of 6 mm. The last turn formed a tight coil in which was placed a thermometer. The electric furnace discharged to a cooler having a tube 7 cm. in diameter and 50 cm. long which discharged in turn to three cold traps held at −80° C. by a mixture of acetone and Dry Ice ($CO_2$ snow).

The reservoir contained 452 g. of trioxane which had been distilled so as to be free of chlorine and to contain only 160 p.p.m. of water. Nitrogen was used to sweep out the whole apparatus before the trioxane was passed to the vaporizer from whence it issued at 150°–180° C. The trioxane entered the furnace which was heated to 490° C. and at an average flow of 80 g./hr. The temperature of the gas at the discharge of the furnace was 380° C. The gas passed to the heat exchanger and thence to the cold traps whence it was chilled to −80° C. The yield was 444 g. of formaldehyde, 98% of the weight of the trioxane used. The formaldehyde contained 160 p.p.m. of water. It was stored at −80° C. for a week without any trace of polymerization.

EXAMPLE 2

The apparatus of Example 1 received 618 g. of freshly distilled trioxane containing 200 p.p.m. of water. After agitation of other gases by nitrogen the flow through the furnace was 100 g./hr. and the temperature of the gas at the discharge end was 420° C. 609 g. of formaldehyde were received, a yield of 98.5%, containing 200 p.p.m. of water.

EXAMPLE 3

15 kg. of pure trioxane containing 120 p.p.m. of water was sent in two hours through a tubular heat exchanger where is was progressively heated, vaporized and depolymerized at 430° C. The yield, 99% of formaldehyde, was obtained after passing the gases from the furnace through a heat exchanger. These 14,850 kg. contained 0.1% of CO and 120 p.p.m. of water. The 150 g. which were not found in the cold trap were found in the heat exchanger as a homoploymer.

A polymer prepared from the monomer possessed a mean molecular weight of 53,000, its constant for the speed of thermal degradation at 222° C. ($k_{222}$), which represents the loss of weight per minute based on the weight of the residual polymer, was 0.83% g./min. prior to stabilization of the polymer by acetylation. The polymer when hot pressed yielded films which resist numerous bendings in a standard bending test without cracking.

EXAMPLE 4

A reservoir having a capacity of 100 kg. of pure trioxane supplied 500 g. of trioxane every 3 minutes to a trioxane melting-pot operating in an atmosphere of nitrogen. When the melting-pot contained 50 kg. of molten trioxane a pump sent a continuous stream to a pre-heater vaporizer at 10 kg./hr. The trioxane, in vapor state at 170° C., then passed to a water tube furnace having quartz tubes which were heated to 490° C. The trioxane was monomerized to formaldehyde in the tubes and the vapors issuing at 420° C. were chilled to room temperature by a battery of heat exchangers placed in parallel and functioning simultaneously. By this means it is possible to shut down one heat exchanger and to eliminate the small deposits of homopolymers formed in it, without interrupting the process. The monomeric formaldehyde was obtained in a yield of 98 kg. containing less than 180 p.p.m. of water, was sent directly to a polymerizer of continuous type and produced a product comparable to that which is described in the preceding examples.

The advantages of the invention are in the production of a very pure formaldehyde which possesses exceptional stability when stored as a liquid, and in the production of formaldehyde which, upon polymerization, produces polymers of high molecular weight. The process, the apparatus, and the formaldehyde of this quality are novel. Process and apparatus are of simple construction, durable, relatively inexpensive to construct and operate, and very satisfactory in large scale operation.

As many apparently widely different embodiments of the present invention may be made without departing from the spirit and scope thereof, it is to be understood that the invention is not limited to the specific embodiments.

What is claimed is:

1. A method of making stable monomeric formaldehyde which comprises pyrolytically depolymerizing trioxane containing less than 300 p.p.m. of water by heating at atmospheric pressure in an inert medium in the absence of a depolymerization catalyst at a depolymerizing temperature above 350° C. and below 500° C., and below the temperature of disintegration of the trioxane and separating the stable monomeric formaldehyde produced by the depolymerization from traces of gases.

2. A method of making very pure stable monomeric formaldehyde from trioxane containing not substantially more than 300 p.p.m. of water which comprises pyrolytically depolymerizing said trioxane containing only minute amounts of water, by heating at atmospheric pressure in an inert medium free from any depolymerization catalyst and oxygen at a depolymerizing temperature in the range of 350° to 500° C. and below the temperature of disintegration of the trioxane.

3. A method of making very pure stable formaldehyde which comprises vaporizing molten trioxane containing not substantially more than 300 p.p.m. of water in an inert atmosphere at a temperature circa 200° C. at atmospheric pressure, heating the vaporized trioxane at 350°–500° C. in the absence of a depolymerization catalyst and at atmospheric pressure until depolymerization occurs, cooling, the stable formaldehyde formed by the depolymerization to about −80° C., and removing any CO and H from the stable limped liquid monomeric formaldehyde.

4. A method of making a very pure stable limpid liquid formaldehyde which comprises vaporizing trioxane containing not substantially over 300 p.p.m. of water, pyrolytically depolymerizing the vaporized trioxane to monomeric formaldehyde by heating at atmospreic pressure and in the absence of a catalyst to a temperature above 380° C. and at a temperature below 500° C. at which it disintegrates, and cooling the formaldehyde to a limpid liquid which is stable against any polymerization for one week at −80° C.

5. A method of polymerizing formaldehyde to very pure polymers of high molecular weight, which comprises vaporizing trioxane containing not substantially more than 300 p.p.m. of water, heating the vaporized trioxane at substantially atmospheric pressure and in the absence of a catalyst to a temperature above 350° C. and below 500° C. thereby pyrolytically depolymerizing the vaporized trioxane at a temperature below that at which it disintegrate and polymerizing the formaldehyde resulting from the depolymerization to a high molecular weight polymer.

6. The method of claim 2 in which the temperature of depolymerization is between 380° and 420° C.

7. The method of claim 2 in which the depolymerization is within a space which is kept free of oxygen by the passage of nitrogen.

8. The method of claim 2 in which the trioxane flows to a region of vaporizing temperature, thence to a region of depolymerizing temperature, and thence as formaldehyde to a region of cooling temperature which reduces it to a temperature suitable to polymerization.

9. The method of claim 2 in which the depolymerization is in gas phase.

10. The method of claim 2 in which the trioxane is in solution in an inert solvent.

References Cited

UNITED STATES PATENTS

| | | | |
|---|---|---|---|
| 2,790,755 | 4/1957 | Walker | 202—69 |
| 3,226,444 | 12/1965 | Fischer et al. | 260—606 |
| 2,784,065 | 3/1957 | Painter | 23—277 |
| 3,124,424 | 3/1964 | Hartley et al. | 23—262 |
| 3,199,265 | 8/1965 | Takashi et al. | 55—22 |

OTHER REFERENCES

Burnett et al., Transactions Faraday Society, vol. 34, (1938), pp. 420–426.

Walker et al., Industrial and Engineering Chemistry, vol. 39, (August 1947), pp. 974–977.

Schnizer et al., Journal of the American Chemistry Society, vol. 75 (17), (Sept. 5, 1953), pp. 4347–4348.

Hogg et al., Journal Chemical Society (1961), pp. 1403–1404.

Giefer et al., Die Makromolekulare Chemie, vol. 74 (1964), pp. 46–54.

WILLIAM H. SHORT, Primary Examiner

L. M. PHYNES, Assistant Examiner

U.S. Cl. X.R.

260—340, 606